United States Patent
Guinnard et al.

(10) Patent No.: US 10,187,205 B2
(45) Date of Patent: Jan. 22, 2019

(54) APPARATUS AND METHOD FOR QKD QUANTUM COMMUNICATION CHANNEL CONTINUOUS SYNCHRONIZATION AND ALIGNMENT

(71) Applicants: Olivier Guinnard, Saxon (CH); Raphael Houlman, Genève (CH)

(72) Inventors: Olivier Guinnard, Saxon (CH); Raphael Houlman, Genève (CH)

(73) Assignee: Université de Genève, Geneva (CH)

( * ) Notice: Subject to any disclaimer, the term of this patent is extended or adjusted under 35 U.S.C. 154(b) by 284 days.

(21) Appl. No.: 14/925,096

(22) Filed: Oct. 28, 2015

(65) Prior Publication Data

US 2016/0134420 A1    May 12, 2016

(30) Foreign Application Priority Data

Nov. 10, 2014   (EP) .................................. 14192527

(51) Int. Cl.
*H04L 9/08*   (2006.01)
*H04B 10/70*   (2013.01)

(52) U.S. Cl.
CPC ........... *H04L 9/0852* (2013.01); *H04B 10/70* (2013.01)

(58) Field of Classification Search
CPC ............................. H04L 9/0852; H04B 10/70
See application file for complete search history.

(56) References Cited

U.S. PATENT DOCUMENTS

| | | | |
|---|---|---|---|
| 5,768,378 A | 6/1998 | Townsend et al. | 380/21 |
| 6,834,367 B2 | 12/2004 | Bonneau et al. | 714/738 |
| 7,539,314 B2 | 5/2009 | Berzanskis et al. | 380/278 |
| 7,580,524 B2 | 8/2009 | Gisin et al. | 380/256 |

(Continued)

FOREIGN PATENT DOCUMENTS

| | | | | |
|---|---|---|---|---|
| WO | WO2007/050285 A2 | 3/2007 | | H04L 9/00 |
| WO | WO2011/094520 A2 | 4/2011 | | H04L 9/08 |

OTHER PUBLICATIONS

Tanaka, Akihiro et al., "Ultra fast quantum key distribution over a 97 km installed telecom fiber with wavelength division multiplexing clock synchronization", Jul. 21, 2008, vol. 16, No. 15, Optics Express, 7 pages.

(Continued)

*Primary Examiner* — Eleni A Shiferaw
*Assistant Examiner* — Hee K Song
(74) *Attorney, Agent, or Firm* — Thomas Coester Intellectual Property

(57) ABSTRACT

System and methods for synchronizing and aligning quantum channel for Quantum Key Distribution. The primary object of the invention is to allow a Quantum Key Distribution (QKD) apparatus to work continuously with only two communication channels, a quantum communication channel and a service channel. This is achieved by linking the clock frequencies of both channels and completed by an over-sampling method for phase synchronization tracking. Clock signal carry is done through data using a clock data recovery encoding techniques. Having a continuous operating QKD system is not possible without a tracking system that enables phase alignment. This synchronization and alignment system and method for QKD has multiple benefits as it allows real-time synchronization with continuous data flow and is not dedicated to a specific quantum protocol.

8 Claims, 6 Drawing Sheets

(56) References Cited

U.S. PATENT DOCUMENTS

| | | | | |
|---|---|---|---|---|
| 7,809,269 B2* | 10/2010 | Mitchell | .............. | H04L 9/0852 380/256 |
| 7,869,599 B2 | 1/2011 | Tajima | .......................... | 380/256 |
| 8,050,566 B2 | 11/2011 | Luo et al. | ...................... | 398/89 |
| 8,683,192 B2* | 3/2014 | Ayling | ................. | H04L 9/0858 380/256 |
| 8,755,687 B2 | 6/2014 | Dynes et al. | ................... | 398/40 |
| 2003/0231771 A1* | 12/2003 | Gisin | .................... | H04L 9/0852 380/255 |
| 2005/0180575 A1* | 8/2005 | Maeda | ................. | H04L 7/0075 380/278 |
| 2006/0018475 A1 | 1/2006 | Vig et al. | ...................... | 380/256 |
| 2007/0065155 A1 | 3/2007 | Luo et al. | ..................... | 398/141 |
| 2007/0110454 A1* | 5/2007 | Maeda | ................. | H04B 10/548 398/188 |
| 2007/0133799 A1* | 6/2007 | Vig | ....................... | H04B 10/70 380/256 |
| 2008/0013738 A1* | 1/2008 | Tajima | ................. | H04L 9/0852 380/278 |
| 2008/0137858 A1 | 6/2008 | Gelfond et al. | ............. | 380/256 |
| 2008/0292102 A1* | 11/2008 | Wang | .................... | H04L 9/0852 380/275 |
| 2011/0019823 A1* | 1/2011 | Townsend | ............ | H04L 9/0852 380/256 |
| 2011/0075839 A1* | 3/2011 | Noh | ...................... | H04L 9/0858 380/44 |
| 2011/0243331 A1* | 10/2011 | Yasuda | ................. | H04L 9/0662 380/279 |
| 2011/0317836 A1* | 12/2011 | Yeh | ....................... | H04L 9/0855 380/256 |
| 2012/0177200 A1* | 7/2012 | Harrison | ................ | H04B 10/70 380/278 |
| 2012/0294625 A1 | 11/2012 | Dynes et al. | ................. | 398/155 |
| 2015/0134947 A1* | 5/2015 | Varcoe | .................. | H04L 9/0858 713/150 |

OTHER PUBLICATIONS

Rubenok, A., et al., "Real-world two-photon interference and proof-of-principle quantum key distribution immune to detector attacks", arXiv: 1304.2463v1, Apr. 9, 2013, pp. 1-10.

Sasaki, M., et al., "Field test of quantum key distribution in the Tokyo QKD Network", 2011, pp. 1-21.

Mo, X.F., et al., "Time-Cost analysis of a quantum key distribution system clocked at 100 MHZ", arXiv:1105.3761v1, May 18, 2011, 8 pages.

Gisin, Nicolas, et al., "Quantum Cryptography", Rev. of Mod. Phys. 74, 2002 The American Physical Society, pp. 145-195.

Bennett, Charles H., et al., "Quantum Cryptography: Public Key Distribution and Coin Tossing", Bennett—Brassard 84 protocol (BB84), Proceedings IEEE Int. Conf. on Computers, Systems and Signal Processing, Bangalore, India (IEEE, New York, 1984), pp. 175-179.

* cited by examiner

APPARATUS AND METHOD FOR QKD QUANTUM COMMUNICATION CHANNEL CONTINUOUS SYNCHRONIZATION AND ALIGNMENT This application relates to EPO Application No. EP14192527, filed Nov. 10, 2014, which is hereby incorporated by reference in its entirety.

The present invention relates to a method of synchronizing two transmission channels between a transmitter and a receiver, one being a quantum channel, transmitting quantum key signals and the other, a service channel, transmitting information data signals, wherein said two channels are synchronized by means of clock signals transmitted from the transmitter to the receiver.

BACKGROUND OF THE INVENTION

In the following applicant will describe in great detail the methods used before, whereby this detailed description is relatively voluminous and believed to greatly facilitate the understanding of the present invention, because the invention relates to an aspect whose environment becomes clear upon studying the prior art.

Direct reference will be made to some of the following documents, the others are cited to provide material for the interested readers only.

The invention relates to and improves methods described in U.S. Pat. Nos. 5,768,378/6,834,367/7,539,314/7,869,599/8,050,566/8,755,687 as well as published US patent applications 2006/0018475 and 2012/0294625.

Non-patent literature includes:

[A]—A. Rubenok, J. A. Slater, P. Chan, I. Lucio-Martinez, and W. Tittel, Real-world two-photon interference and proof-of-principle quantum key distribution immune to detector attacks, arXiv:1304.2463v1 (2013)

[B]—M. Sasaki, M. Fujiwara, H. Ishizuka, W. Klaus & al., Field test of quantum key distribution in the Tokyo QKD Network (2011)

[C]—X. F. Mo, I. Lucio-Martinez, P. Chan, C. Healey, S. Hosier, W. Tittel, Time-cost analysis of a quantum key distribution system clocked at 100 MHz (2011)

[D]—A. Tanaka, M. Fujiwara, S. W Nam, Y. Nambu, S. Takahashi, W Maeda, K. Yoshino, S. Miki & al., Ultra fast quantum key distribution over a 97 km installed telecom fiber with wavelength division multiplexing clock synchronization (2008)

FIELD OF THE INVENTION

The present invention relates generally to the field of quantum cryptography, and more precisely to apparatus and methods enabling synchronization and phase alignment of Quantum Key Distribution systems.

GLOSSARY

Classical Channel: logical connection over a multiplexed transmission medium such as an optical fiber. Several classical channels can share the same medium as in wavelength division multiplexing (WDM) techniques where each channel has a dedicated wavelength and all wavelengths propagate through the same optical fiber. Data classical channels are used for the transmission of classical information. An example of classical information is a text document transmitted over the Internet (data).

Service Channel: Classical Channel dedicated to machine operation. This channel is commonly used for several functionalities such as sifting, distillation and authentication, in the case of QKD apparatus.

Quantum Channel: transmission medium which can transmit quantum particles, as e.g. single photons that can go through optical fibers. Those quantum particles can be used for the coding of bit values. In this case, those quantum particles are called qubits (quantum bits).

Quantum communication channel: flow of quantum particles or states carrying information over a quantum channel, e.g. flow of qubits propagating through an optical fiber. This quantum communication channel can be multiplexed with a classical channel on the same transmission medium.

Clock data recovery: process of extracting and reconstructing clock and data information from the single serial data stream of a classical channel.

PRIOR AND RELATED ART

Explanation of What is QKD

If two users possess shared random secret information (herebelow called the "key"), they can achieve, with provable security, two of the goals of cryptography: 1) making their messages unintelligible to an eavesdropper and 2) distinguishing legitimate messages from forged or altered ones. A one-time pad cryptographic algorithm achieves the first goal, while Wegman-Carter authentication achieves the second one. Unfortunately both of these cryptographic schemes consume key material and render it unfit for further use. It is thus necessary for the two parties wishing to protect the messages they exchange with either or both of these cryptographic techniques to devise a way to exchange fresh key material. The first possibility is for one party to generate the key and to inscribe it on a physical medium (disc, CD-ROM, rom) before passing it to the second party. The problem with this approach is that the security of the key depends on the fact whether it has been protected during its entire lifetime, from its generation to its use, until it is finally discarded. In addition, it is unpractical and very tedious.

Because of these difficulties, in many applications one resorts instead to purely mathematical methods allowing two parties to agree on a shared secret over an insecure communication channel. Unfortunately, all such mathematical methods for key agreement rest upon unproven assumptions, such as the difficulty of factoring large integers. Their security is thus only conditional and questionable. Future mathematical development may prove them totally insecure.

Quantum cryptography or Quantum Key Distribution (QKD) is a method allowing the distribution of a secret key between two distant parties, the emitter and the receiver, with a provable absolute security. An explanation of the method can be found in Nicolas Gisin, Grégoire Ribordy, Wolfgang Tittel, and Hugo Zbinden, "Quantum Cryptography", Rev. of Mod. Phys. 74, (2002), the content of which is supposed to be known to the skilled person in the art. The two parties encode the key on elementary quantum systems, such as photons, which they exchange over a quantum channel, such as an optical fiber. The security of this method comes from the well-known fact that the measurement of the quantum state of an unknown quantum system modifies the system itself. In other words, a spy eavesdropping on the quantum communication channel cannot get information on the key without introducing errors in the key exchanged between the emitter and the receiver. Equivalently, QKD is secure because of the no-cloning theorem of quantum mechanics, which ensures that a spy cannot duplicate the transmitted quantum system and forward a perfect copy to the receiver.

Principle

Several QKD protocols exist. These protocols describe how the bit values are encoded on quantum systems using sets of quantum states and how the emitter and the receiver cooperate to produce a secret key. The most commonly used of these protocols, which was also the first one to be invented, is known as the Bennett—Brassard 84 protocol (BB84), disclosed by Charles Bennett and Gilles Brassard in Proceedings IEEE Int. Conf. on Computers, Systems and Signal Processing, Bangalore, India (IEEE, New York, 1984), pp. 175-179), the content of which is supposed to be known to the man of the art as well. The emitter encodes each bit on a two-level quantum system either as an eigenstate of $\sigma_x$ (|+x> coding for "0" and |−x> coding for "1") or as an eigenstate of $\sigma_y$ (|+y> or |−y>, with the same convention). One says that the bits are encoded in two incompatible bases. For each bit, the emitter uses an appropriate random number generator to generate two random bits of information, which are used for determining the bit value (one random bit) and the basis information (one random bit). The quantum system is sent to the receiver, who analyses it in one of the two bases, i.e. measures either $\sigma_x$ or $\sigma_y$. The receiver uses an appropriate random number generator to produce a random bit of information used for determining the measurement basis (the basis information). The measurement basis is selected randomly for each quantum system. After the exchange of a large number of quantum systems, the emitter and the receiver perform a procedure called basis reconciliation. The emitter announces to the receiver, over a conventional and public communication channel, which is called service channel, the basis x or y (eigenstate of $\sigma_x$ or $\sigma_y$) in which each quantum system was prepared. When the receiver has used the same basis as the emitter for his measurement, he knows that the bit value he has measured must be the one which was sent over by the emitter. He indicates publicly for which quantum systems this condition is fulfilled. Measurements for which the wrong basis was used are simply discarded. In the absence of a spy, the sequence of bits shared is error free. Although a spy who wants to get some information about the sequence of bits that is being exchanged can choose between several attacks, the laws of quantum physics guarantee that he will not be able to do so without introducing a noticeable perturbation in the key.

Rough Description of the Hardware

As described above, the two parties exchange single photons, each of them carries one bit value. Those bit values carried by quantum particles are called qubits. In a QKD system one party is a qubit emitter and the other party is a qubit receiver. The transmission line used for the transmission of the qubits between the emitter and the receiver is called the quantum channel. The quantum communication link between the emitter and the receiver composed of qubits transmitted through the quantum channel is called quantum communication channel. In addition to this quantum channel, the two parties use a conventional and public channel to exchange conventional bit values (i.e. for classical communications). This channel will be called the service channel in the following lines i.e. the channel that is used for the communications needed during the post-processing of the sequence of exchanged quantum particles. In particular, this channel is used for the basis reconciliation, the parameter estimation (or quantum bit error rate estimation), the error correction step if needed and the privacy amplification (all those steps are described by Nicolas Gisin et al.). This service channel can be implemented with any kinds of technology allowing one to exchange data between two remote parties (e.g. two PCs connected together through an Ethernet wire). The service channel works as a bidirectional channel between the two parties.

In summary, to perform QKD, one need to implement two parties, one qubit emitter and one qubit receiver, that are linked, for communication, by at least two channels. One quantum communication channel that allows them to exchange the qubits and one service channel that allows them to communicate together.

Explanation of the Quantum Communication Channel Synchronization Aspects of QKD

Why do we Need to Synchronize the Quantum Communication Channel?

QKD systems are communication systems. So, as for any kind of communication systems, the synchronization of both the quantum communication and the service channels is crucial for a practical QKD. The synchronization of one channel consists in knowing precisely when the bit number 'n' is expected to arrive to the receiver. This timing is very important because it defines when the receiver samples its detector output to determine the value of this bit number 'n'. If there is a problem with the synchronization, the receiver might consider the value of the $m^{th}$ bit sent by the emitter as the $n^{th}$ bit. Hence, a proper synchronization of a communication channel is needed in order to perform a proper communication.

In the case of the service channel, since it is a conventional communication channel, one can use the conventional synchronization techniques as for example the data and clock recovery technique which will be detailed below.

In the case of the quantum communication channel, it is much trickier because the bit value carriers travelling in this channel are single quantum particles like single photons for example. One of the main differences between conventional communication channels (as bright optical pulses propagating through an optical fiber) and quantum communication channels (as single photons propagating through an optical fiber) is that only two output values are possible in the first case whereas three output values are possible in the latest case. Indeed, an optical fiber has some loss that attenuates the optical signal. In the case of classical communications, one can adjust the intensity of the bright optical pulses in such a way that there is always enough intensity at the end of the channel for the receiver to try to determine if it is a bit value '0' or '1'. In a quantum communication channel, the transmission of the optical fiber, resulting from its loss, defines the probability that the single photon emitted at one end reaches the other end. In addition to that, the efficiency of detection of the single photon detector of the receiver is smaller than 1 too. This means that the receiver might not detect any single photon, either because it didn't reach the fiber end or because its detector didn't detect it. Hence, three output values are possible in the case of a quantum communication channel: bit value '0'; bit value '1', or 'no detection'. The fact that through a quantum channel one can get a result 'no detection' makes the synchronization techniques used for classical communication channels unusable in the case of the synchronization of a quantum communication channel. This issue is also reported in U.S. Pat. No. 8,755,687, Moreover, in the case of high speed QKD (frequency clock of the emitter>100 MHz) the precision of the quantum communication channel synchronization has to be much higher than in the case of a classical communication channel. Indeed, to limit the impact of the noise of single photon detectors in quantum communications (note that the noise level of single photon detectors of a QKD system is the limiting factor for the maximal distance the system can work on), the duration of the sampling (also called acquisition) timing of detections is very short compared to the time interval separating two consecutive qubits. The duration of the sampling timing is the period of time during which a detection event is considered as relevant by the QKD system, so is recorded by the system. All detections happening outside the sampling timing are not recorded, so won't be part of the qubits exchange. The qubit is made as short as possible so that the detector can be activated and/or sampled during a short period of time. Because the noise of a single photon detector is proportional to the duration of its sampling timing, a shorter period of sampling implies a smaller noise. In the case of classical communications, the duration of bright pulses is about the duration of the time interval between two consecutive optical pulses. In this case, the precision on the synchronization of the channel has to be about one fraction of it (e.g. 30 to 50% of the time interval between two consecutive pulses). If the duration of the sampling timing of a quantum receiver is about the tenth of the time interval between two consecutive qubits, the precision needed on the synchronization is about a fraction of the duration of a qubit (30 to 50% of the tenth of the time interval between two consecutive qubits).

In summary, a quantum communication channel has to be synchronized, as any kinds of communication channels, to allow the emitter and the receiver to put the same index on a qubit. Furthermore, the precision on the quantum communication channel synchronization is much higher than what is needed for a conventional communication channel. If a precise synchronization scheme for the quantum channel is not implemented in a QKD system, this system cannot work properly.

The receiver will not identify the quantum signal correctly without the sampling timing of the detection synchronized with the photon arrival. Nevertheless, based on estimation proposed by [D], photon arrival time may drift due to changes in the optical distance of the quantum channel. For example, a temperature variation of 1 degree Celsius results in more than 1 meter change in a 100 km fiber, which corresponds to 5 ns propagation delay in an optical fiber, i.e. about three timeslots in a 625 MHz clock system. This means that a continuous synchronization of the quantum communication channel is needed if one wants the QKD apparatus to run continuously at its optimal throughput.

How is Quantum Communication Channel Synchronization Performed in Existing Implementations?

Till now, in QKD system implementations, a dedicated synchronization channel, which can be called clock channel or signal, is used to perform the synchronization of the quantum channel. This additional classical channel is dedicated to the task of synchronization. i.e., the symbols propagating through it are uniquely used for this purpose. In general, this synchronization channel consists in the exchange of strong optical pulses at a frequency equal to the frequency or its harmonics of the qubits emission. The synchronization is in general multiplexed in the quantum channel with the communication channel, if for example the qubit emitter generates the synchronization symbols too, the delay between the emission of a qubit and its paired synchronization symbol is fixed and measured during the fabrication and characterization of the emitter. On the receiver side, the apparatus receives the qubit and the paired symbol separated in time by a fixed difference that can be determined easily during the fabrication and characterization phases. So, each time the receiver detects a synchronization symbol, it knows perfectly when the paired qubit will arrive. The same kind of approach can be considered if the qubit receiver emits the synchronization symbols.

So, in terms of implementation, a QKD system is composed of two remote boxes (an emitter and a receiver) linked via three communication channels: one quantum channel; one service channel, and one synchronization channel. Reducing channel numbers used by a QKD system is an important issue since each extra channel corresponds to an additional cost. Several approaches were proposed to solve this problem. A first approach consists in realizing wavelength division multiplexing (WDM) between synchronization channel and the two other channels. This option affects the final performance of the QKD system because the quantum signal will be spoiled by noise coming from the synchronization channel. Moreover, in terms of cost, this approach doesn't change anything because operating expenses of a running QKD device is highly impacted by the number of wavelengths used. In the case of WDM, the cost corresponds to the use of three wavelengths. Another approach would be to do Time Division Multiplexing (TDM) between the synchronization channel and the quantum one. This works quite well but this means that one channel is shared between two tasks: the synchronization and the qubit transmission. This leads to a reduction of qubit transmission rate because qubit transmission is stopped when synchronization is performed. On top of that, this approach makes the synchronization less robust because it doesn't work continuously. So, from time to time, the synchronization of the quantum channel might be lost. This will force a restart of the QKD system and further reduces the final secret key rate. Different descriptions of those approaches of this configuration (QKD with three communication channels) have been proposed either in patents (U.S. Pat. No. 7,869,599; U.S. Pat. No. 8,050,566; U.S. Pat. No. 7,580,524; U.S. Pat. No. 5,768,378; US patent application 2006/0018475; US patent application 2012/0294625; U.S. Pat. No. 7,539,314) or scientific articles ([A]; [B]; [C]; [D]). All of them are variations of the concept shown in FIG. 1. A QKD system is composed of one emitter A (100) and one receiver B (200). Both are linked by three channels: one synchronization channel (300), one quantum communication channel (400) and one service channel (500). The emitter A (100) is composed of two subsystems: a quantum key engine emitter (110) that generates raw keys (130) by emitting qubits, and a post-processing unit (120) that extracts the secret keys from the raw keys (130). In the quantum key engine emitter (110), there are at least a time reference unit (111) which provides a clock signal to a quantum emitter (112). The receiver (200) is composed of two subsystems: a quantum key engine receiver (210) that generates raw keys (230) by receiving qubits, and a post-processing unit (220) that extracts the secret keys from the raw keys. In the quantum key engine receiver (210), there is at least a synchronization unit (211) that retrieves the synchronization going through (300) and provides it for the synchronization of a time reference unit (212). This unit (212) provides a clock signal to a quantum receiver (213). Both post-processing units (120 and 220) are linked via the service channel (500). The quantum emitter (112) and receiver (213) exchange qubits through the quantum channel (400). The synchronization channel (300) is used for the transmission of the synchronization signal between both time reference units (111 and 212). In the case of FIG. 1, quantum communication channel (400) synchronization is performed through the synchronization channel (300) by synchronizing two remote time reference units (111 and 212). In general both channels (300 and 400) are multiplexed in the same physical channel (e.g. a single optical fiber).

In the case of the synchronization symbols going through another physical link than the qubits, an adjustment procedure needs to be implemented because the two physical links don't experience the same external parameter (e.g. temperature or stress) changes. This difference in external parameter variation leads to delay difference in qubits propagation in comparison with the synchronization signal. So, without any extra operation, the synchronization of the quantum channel is lost after a working duration that depends on how large the fluctuation difference is between the two physical links. This extra operation consists in evaluating and compensating the delay difference between the two channels in such a manner that the synchronization of the quantum communication channel is continuously performed. This extra operation is called the tracking of the synchronization of a quantum communication channel. Tracking can be performed even when both channels are multiplexed in the same physical link. One example of tracking of the synchronization of the quantum channel is explained in US patent application 2007/133799. In this example, the proper positioning of the detection gates, which corresponds to the tracking of the quantum communication channel synchronization, is done in a stochastic manner, in the sense that Bob is not able to guess how to choose the delay in order to maximize the probability of detection. This example is very representative of what has been done so far. The main issue with stochastic approaches in quantum channel synchronization is that it is not robust enough to allow a continuous tracking of the quantum channel synchronization. The higher the clock frequency, the higher the precision needed for synchronization. So, this is especially true in the case of high speed QKD (frequency laser clock larger than 100 MHz). The synchronization loss implies that qubit exchange needs to be stopped from time to time in order to reinitialize the quantum channel synchronization. The lost of the synchronization in stochastic approaches comes from the fact that from time to time, the tracking increases the de-synchronization and is not able to recover then.

In order to perform a continuous tracking of the quantum channel synchronization, one needs to be able to implement a smart tracking in the sense that it is able to estimate the exact (sign and amount) propagation delay difference between the synchronization symbols and the qubits. A smart tracking would allow a continuous working of the synchronization of the quantum channel. Nevertheless, it would not help for the reduction of the number of channels needed for the QKD system proper working (one quantum channel, one service channel and one synchronization channel).

Therefore, the technical problem, which has been sought in vain to be resolved in the past and which is resolved by the present invention is to find a solution permitting to suppress this dedicated synchronization signal and/or the dedicated synchronization channel and still keep a continuously synchronized quantum channel.

Several techniques have been developed for data synchronization one of them commonly known is belonging to clock recovery techniques.
Explanation on Clock Recovery Principle In non-quantum digital systems, data is usually carried with an associated clock signal. Clock provides timing necessary to allow digital circuitry to operate on digital data. When data are transmitted over a communication link, it is traditionally inefficient to also transmit the associated clock signal. However, systems have been improved and designed to overcome this inefficiency, this has led to communication systems which transmit the data along with the clock. Therefore, it is typical for fiber optic communication links to require that clock signal at the receiving end of the link be extracted from the incoming data signal. To obtain the necessary clock signal at the receiving end, these systems employ clock and data recovery circuits. The clock and data recovery circuits derive the clock signal from the received digital data. Conventional clock and data recovery circuits are often implemented using PLL (phase-lock loops) as described in U.S. Pat. No. 6,834,367. Those circuits are combined with specific encoding (e.g. 8b/10b encoding) that facilitate clock recovery process.

Can CDR Techniques be Used for the Synchronization of a Quantum Communication Channel?

It is the specific object of the present invention to devise a way, which permits to use CDR for quantum communications.

As already described by several sources such as US patent application 2012/0294625, clock data recovery techniques are inefficient for synchronization in communication with single photons such as in a QKD Quantum Channel. As single photon (quantum) signals that are transmitted are of extremely weak intensity they cannot be used for clock synchronization. Indeed most of them don't reach the quantum receiver or are not detected by its detectors. Therefore, clock data recovery techniques cannot be applied on the quantum communication channel of a QKD system directly.

SUMMARY OF THE INVENTION

In summary, this invention will solve the following issue:

The reduction of the number of channels that are needed for the proper continuous working of a QKD system, even though standard techniques of self-synchronization of a classical data channel can't be applied directly to a quantum channel.

In order to achieve this, one needs to be able to achieve at least two separated tasks:

Transmitting the clock of the quantum channel through the service channel and quantum communication capacities.

Continuously tracking the quantum communication channel synchronization with the service channel and quantum communication capacities.

The above objects of invention are achieved with a method as described in the preamble of claim 1, which is further characterized in that said clock signals are transmitted by said service channel (500) and in that said clock signals are embedded within said Information data signals and extracted therefrom in the receiver (200) by means of a clock processing unit (250).

According to a particular embodiment of the invention the method is further characterized in that a time gate is opened by the receiver at an expected arrival time of a quantum key signal.

In the above embodiments, it may further be provided, that frequency synchronization is established for the two transmission channels (400, 650) in a first step (630, 650) during a start-up phase (610).

In that case, phase alignment may be established between the two channels by measuring a phase value φ0 corresponding to a time difference (ΔT) between signals sent simultaneously from the transmitter (100) to the receiver (200) through both transmission channels (400, 500).

Further, said time difference may be the difference of the reception time of the signals respectively sent through the two transmission channels.

A system running phase (620) may be initiated after synchronization and alignment, during which information data are transmitted over said service channel (500).

According to a further advantageous embodiment, an ongoing phase tracking may be carried out during said system running phase (620) for detecting and correcting any phase misalignment appearing during said system running phase (620).

The present invention also relates to an apparatus for carrying out any of the methods described in the preceding paragraphs, which apparatus is exempt of a dedicated clock signal transmission channel and which comprises a clock extractor capable of extracting from said information data, transmitted over the service channel (500), clock signals embedded therein.

According to a particular embodiment of the apparatus, it may comprise a phase adaptation step (690), capable of correcting any phase misalignment between said quantum channel (400) and said service channel (500) detected during said system running phase (620) by means of over-sampling with a Quantum state detection system (900). Each and every detection in the receiver needs to be matched with the value encoded in the single photon that the emitter had sent. The system stays synchronized all the time after a start-up phase; this gives the advantage of generating the key without interruption and thus, in average, of generating key bits at a higher rate. To achieve this, the clocks on receiver and emitter are synchronized through the classical channel. Receiver recovers the data and also the clock that is sent from emitter using a Clock Data Recovery (CDR) function.

The benefits of the disclosed invention are threefold. First only two channels are used between the emitter and the receiver of the QKD system, one for Data (and clock) carrying, and the other as Quantum Channel. As a consequence, the disclosed invention has a lower implementation cost than other solutions as there is no need for time nor wavelength multiplexing, no need for an additional fiber and no need for an additional laser. Additionally, the disclosed invention consists in an apparatus enabling continuous data flow which suppresses the need for a re-synchronization phase. This is achieved through clock data recovery techniques and continuous inflow frequency synchronization and inflow phase synchronization thanks to a tracking system. Last but not least, main benefit is that this Quantum Channel synchronization and alignment apparatus and techniques are not dedicated to a specific quantum protocol, it is protocol agnostic and generic.

Using that scheme, both system clocks are completely synchronous.

BRIEF DESCRIPTION OF THE DRAWINGS

FIG. 4 and FIG. 5 are a description of the over-sampling method enabling to track phase shift signal detection.

DETAILED DESCRIPTION OF THE BEST MODE OF THE INVENTION

Figure 1:
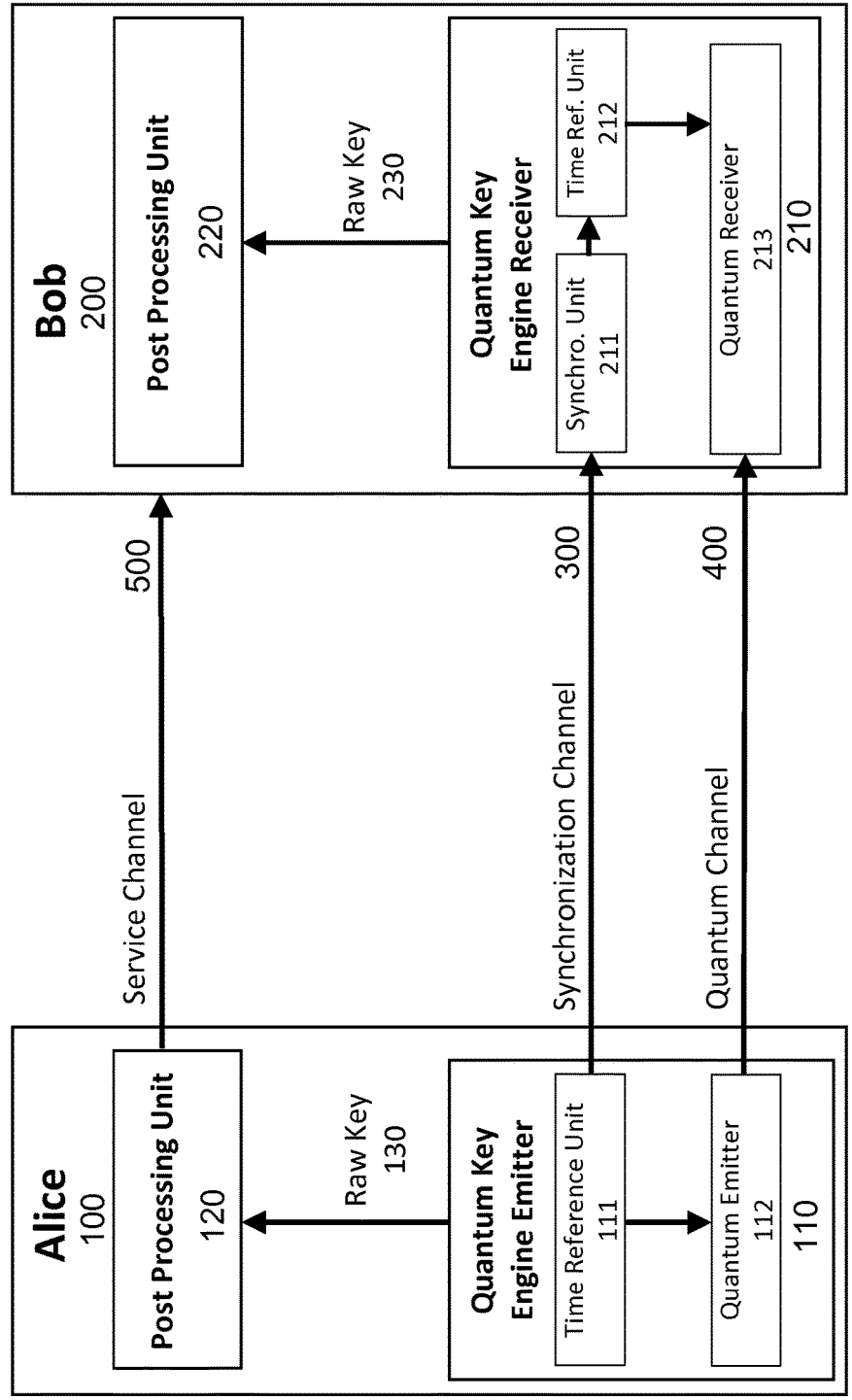
FIG. 1 describes current and prior art related to the invention where Quantum Channel synchronization is made through a specific channel commonly known as synchronization channel or clock channel.

The primary object of the invention is to allow a QKD apparatus to work continuously with only two communication channels, a quantum communication channel and a service channel. This is achieved by linking the clock frequencies of both channels and completed by an over-sampling method for phase synchronization tracking. By 'work continuously', we mean that the quantum channel of the QKD apparatus operates at its operating throughput without any interruptions due to the synchronization procedure. The present invention will be described in detail with reference to the drawings.

When a communication channel works at a fixed frequency, synchronizing this communication channel means that the receiver is able to recover the channel frequency (which is the one of the emitter) and the relative phase between its clock and the emitter clock. When a communication channel doesn't work at a fixed frequency, synchronizing the channel means that the receiver is able to measure the propagation delay of data going from the emitter to the receiver. So, to be able to synchronize a quantum communication channel with the help of a service channel means that the frequency and phase (or delay) estimation can be done only with the quantum communication channel and the service channel capacities. As described in the state of the art, in order to achieve this task, one needs to be able to transmit and/or track frequency and phase of the quantum communication channel without any dedicated synchronization channel.

In the following paragraphs, we will describe the complete method and apparatus for synchronization of a quantum communication channel using only both channel capacities combining both techniques. Then, we will describe how to transmit the quantum communication channel frequency (or delay) using both channel capacities. We will conclude with a description of how our tracking method of the phase (or delay) synchronization of the quantum communication channel using only both quantum and service channel capacities works.

Continuous Synchronization of the Quantum Channel without any Dedicated Synchronization Channel As already explained, a QKD system is composed of one emitter and one receiver which are linked together through at least two channels: a quantum channel, which is used for the transmission of the quantum particles and a service channel through which the classical communications between the emitter and the receiver are exchanged. Both channels need to be synchronized in the sense that the receiver needs to know in advance when it is supposed to receive quantum or classical data from the emitter. The synchronization of the service channel is done with conventional techniques, such as clock recovery techniques, performing the synchronization through a process of encoding the data so that the clock information can be recovered as well as the data. Classical communication channels can be self-synchronized in the sense that there is no need of any other specific signal than the encoded data which goes through it to synchronize it. As explained in the background of the invention section, similar approaches can't be applied to the quantum channel. This is why up to now a third channel is used in QKD: the synchronization channel. This channel is dedicated to the synchronization of the quantum communication channel.

In this invention, we propose to limit the number of channels to two (one quantum channel and one service channel) and to perform continuously the synchronization of the quantum communication channel without any interruption of it once it has been started. Synchronizing a communication channel means that the emitter and the receiver share a clock with the same frequency and the same absolute phase (in the case of a quantum communication channel, this means that the first qubit emitted by the emitter corresponds to the first qubit that the receiver tries to detect). This reduction of the number of channels is possible thanks to the integration of the two previously described methods in a quantum channel synchronization apparatus and method.

Figure 2:
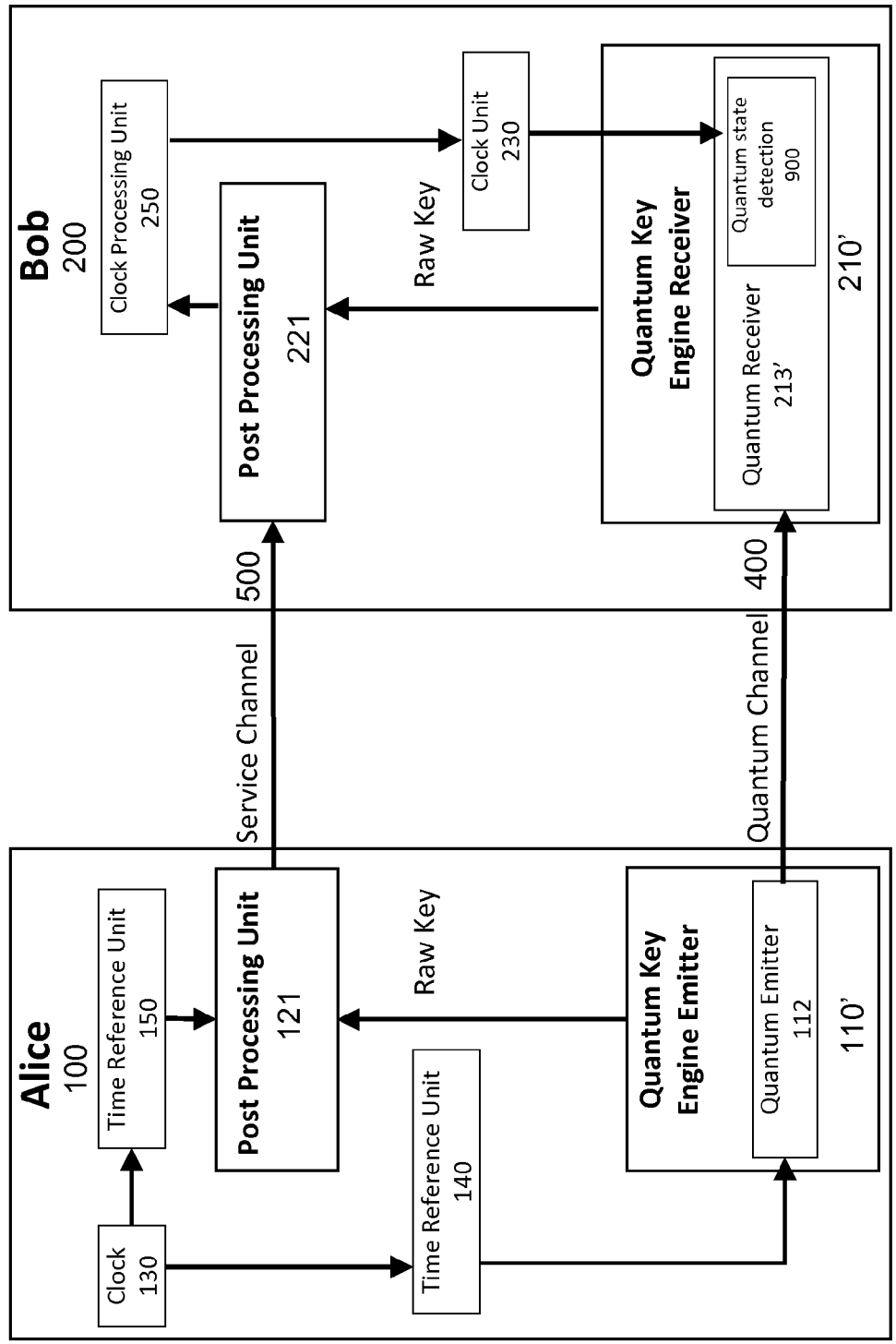
FIG. 2 is a schematic view of the general architecture of the apparatus of the invention.

FIG. 2 is a schematic diagram of the general architecture of the apparatus of the invention. It is simplified for the purpose of understanding the principles of the invention. It represents a QKD system adapted to carry out the synchronization of the quantum communication channel (400) with the help of the service channel (500). QKD system includes two QKD stations, the first one considered as the emitter Alice 100, the second one Bob is the receiver 200. Compare to prior art shown in FIG. 1, the present apparatus link the two remote QKD stations through two communication channels: the quantum communication channel (400) and the service channel (500). Alice (100) is composed of at least three subsystems: the quantum key engine emitter (110') which is an apparatus able to generates quantum states; the post-processing unit (121) which is able to distillate the raw key exchange through the quantum communication channel (400), and a clock unit (130) which can generate a reference clock signal. The clock reference signal of (130) is distributed to two time reference units (140) and (150) through electrical connections (e.g. copper wires). The time reference unit (140) processes this clock signal to generate a clock signal that is provided to the quantum key engine emitter (110') through the electrical connection (e.g. a copper wire). The time reference unit (150) processes this clock signal to generate a clock signal that is provided to the post-processing unit (121) through the electrical connection (e.g. a copper wire). The post-processing unit (121) is very similar to the one from prior art (120) except that it can accept an external clock signal. This clock signal is used as clock reference for the classical communication of the service channel (500). The quantum key engine emitter (110') is similar to the one from prior art (110) except that it can accept an external clock signal. This clock signal is used as clock reference for the emission of the quantum states going through the quantum communication channel (400). Because the two reference units (140) and (150) share the same clock generator (130), their clock signal outputs have linked frequency (those frequencies are proportional). Bob (200) is composed of at least three subsystems: the quantum key engine receiver (210') which is an apparatus able to analyze quantum states; the post-processing unit (221) which is able to distillate the raw key exchange through the quantum communication channel (400), and a clock unit (230) which can distribute a reference clock signal that it receives from another subsystem. The clock reference signal of (230) is distributed to one time reference unit through the electrical connection (e.g. copper wires). The time reference unit processes this clock signal to generate a clock signal that is provided to the quantum key engine receiver (210') through the electrical connection (e.g. a copper wire). The quantum key engine receiver (210') is similar to the one from prior art (210) except that it can accept an external clock signal. This clock signal is used as clock reference for the acquisition of the detection of the quantum states arriving from the quantum communication channel (400). The post-processing unit (221) is very similar to the one from prior art (220) except that it can provide the clock signal that has been recovered on the service channel with a CDR technique. This clock signal is provided to the clock processing unit (250) through the electrical connection. This clock processing unit (250) processes the clock signal coming from (221) to generate a clock signal which has the same frequency than the one of (130). Basically, (250) performs the inverse operation that (150) (e.g. if (150) multiples by 2 the clock signal frequency provided by (130), (250) divides by 2 the frequency of the clock signal provided by (221)). The second difference between the quantum key engine receiver (210') from (210) is the integration of the apparatus described in FIG. 6 in it. This apparatus is an implementation of the phase tracking method described previously.

Figure 3:
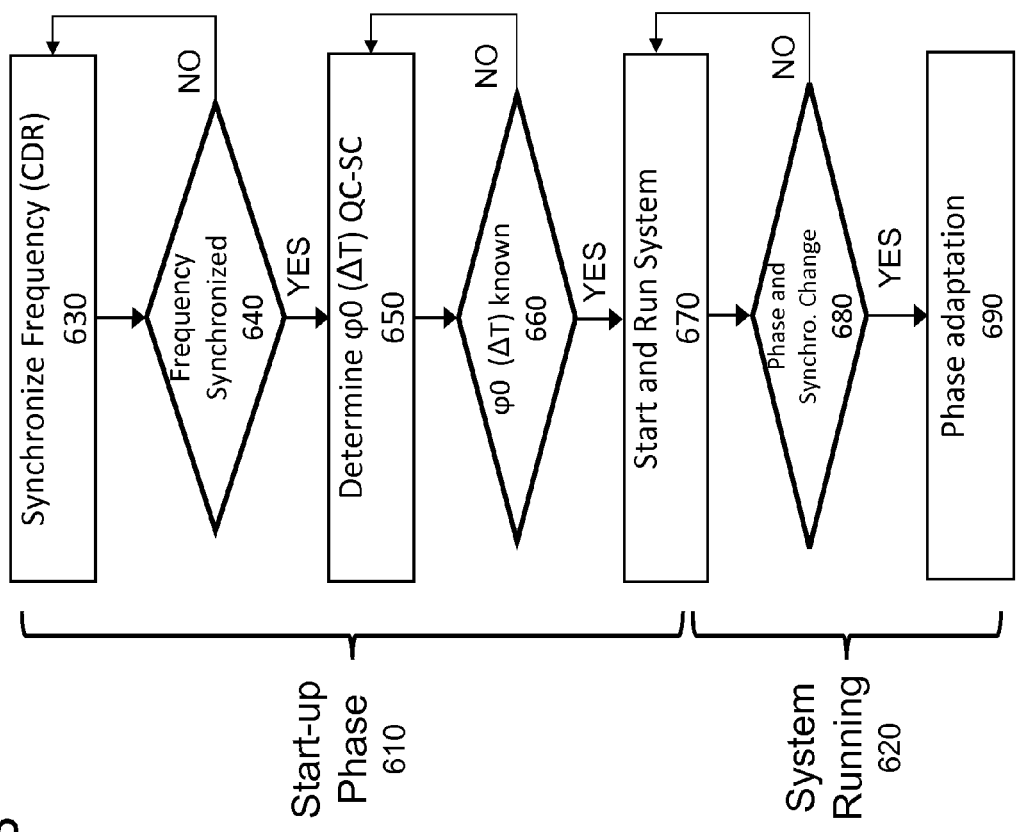
FIG. 3 is a schematic description of the process and method for Quantum Channel synchronization and alignment method.

FIG. 3 describes the method and process for quantum communication channel synchronization and alignment as deployed in the invention. For the receiver, this process consists in determining precisely when the quantum particles are supposed to reach its detectors. This timing determination might be expressed as a delay compared to a reference or, if the quantum particles are emitted in a periodical manner, as a phase respectively to a reference clock signal. In the following description the terms delay and phase when expressed in the context of quantum communication synchronization refer to the same timing concept. The quantum communication channel synchronization is divided in two macro-steps: the start-up phase (610) which enables to get a system initialization and defines the synchronization and alignment parameters before initiating the running-system phase (620). The start-up phase (610) is performed once at the beginning of the working of the QKD system, then the running-system phase (620) is performed continuously in order to continuously synchronize the quantum communication channel. The first stage of the start-up phase consists in getting the frequency synchronization (630, 640) of the quantum communication channel between the emitter and the receiver, in our preferred embodiment described as a quantum communication channel (400). This is done through the use of the method described in section Transmission of the quantum communication channel frequency (or delay) using both the quantum communication channel and the service channel capacities'. It consists mainly in using linked frequencies for the quantum and the service channels. A clock unit (130) is used on the emitter (100) side to share the same reference clock (130) between the post-processing unit (121) and the quantum key engine emitter (110'). The frequencies of the clock used by (121) and (110') can be modified by the time reference units (140) and (150). The frequency clock of the service channel (500) is recovered in the receiver (200) side with CDR techniques. This frequency is processed by (250), then distributed by (230) to the time reference unit. The time reference unit regenerates the frequency of the quantum communication channel on the receiver (200) side.

Once the quantum communication channel frequencies are synchronized on both sides, the step further (650, 660) consists in determining the phase difference ($\varphi 0$) between the service channel (500) and the quantum communication channel (400) at the start-up of the system. This can be performed by using the apparatus and method described in U.S. Pat. No. 7,539,314. Once this value has been determined, it can be sent to the phase generator (930) for being applied onto the clock signal that will be used by the acquisition unit (920).

At the end of the Start-up phase (610) the quantum communication channel (400) has been synchronized in frequency and phase. This means that the sampling of the detectors is performed precisely when the quantum particles impinge in them. However, this technique can't guarantee a continuous synchronization of the quantum communication channel because of the permanent propagation delay fluctuations of the quantum particles. E.g., in the optical fibres, those fluctuations are due to the thermal and strain fluctuations of the fibre, leading to a variation of its optical length. Therefore, additional elements are needed in order to ensure continuous system synchronization and alignment of a quantum communication channel without the help of a dedicated synchronization channel.

Once the system is initialized and the start-up phase finished, the "system running" phase is launched (670). As potentially some phase or frequency drift could appear (680) between Service Channel (500) and Quantum Channel (400), a phase adaptation (690) step is needed in order to have a continuous quantum communication channel synchronization system. In order to perform this continuous synchronization system, one needs to compensate continuously for the frequency fluctuations and for the phase fluctuations. The continuous synchronization of the quantum channel frequency on both sides is performed with the same apparatus and method as the one used in the startup phase (610). Thanks to the fact that the frequency of the service channel is continuously synchronized with conventional techniques (CDR), if the frequency of the quantum communication channel is continuously linked to the one of the service channel, the recovery of the frequency of the quantum channel is performed at the same time as the one of the service channel. The continuous synchronization of the phase of the quantum communication channel is performed with a phase tracking system based on a continuous measurement. This system estimates what is the exact phase correction (the amount and the sign of the phase compensation are estimated) that needs to be made to optimize the synchronization. The tracking apparatus and method used in our quantum communication channel synchronization method is the one described in the section 'Tracking of the phase of the synchronization of the quantum communication channel of a QKD system'.

In further Embodiments of the invention clock data recovery technique allow Alice 100 and Bob 200 to share the same clock. If Quantum Channel (QC) and Service Channel (SC) use clock frequencies which are proportional, only the phase between the two clocks might be an issue. In that case, two options are possible to solve this issue:

An existing ultra-stable phase difference between the two clocks by construction, this can be obtained by stable difference of arm length, propagation through the same optical cable combining the clock recovery with a smart tracking.

However, this technique can't guarantee a continuous synchronization of the quantum channel if the QKD apparatus experiences external parameter fluctuations (e.g. temperature). In this invention a Smart tracking is based on a continuous measurement, we know in which direction and what is the amount of the phase change to optimize the quantum communication channel synchronization.

While the present invention is described above in connection with preferred embodiments, it will be understood that it is not so limited to the described or illustrated embodiments, but by the scope of the appended claims.

Tracking of the Phase of the Synchronization of the Quantum Communication Channel of a QKD System As explained in the state of the art, the synchronization of a quantum communication channel consists in synchronizing the acquisition (or sampling) of the quantum state detectors with the time of arrival of those quantum states. If the quantum states are emitted in a periodical manner, the frequency and phase of the acquisition have to be synchronized with the frequency and phase of the emitted quantum states. This means that the difference between those two frequencies equals zero and the phase difference is zero too.

In this invention, we propose a method for the tracking of the quantum communication channel synchronization based on an acquisition gate frequency rate which is larger than the qubit emission rate. So, contrary to what has been done so far, we do oversampling the detection in the sense that we sample the qubits (or quantum states) at a higher rate than they have been generated at Alice. This oversampling won't improve the detection of the qubits, but will facilitate and enhance the synchronization tracking of the quantum channel. E.g., if the ratio of oversampling (ratio between the detection frequency and the qubit emission frequency) is two, the time period of acquisition gates will be half the one of the qubit emission. In this case, the acquisition gate sequence will be adjusted in such a way that half of the gates are superimposed with the time of arrival of a qubit and the other ones are applied when no qubits arrive on the detectors. In practice, because the time period of the qubit emission can be made as small as possible in order to increase as much as possible the emission rate, the emission distribution tails of two consecutive qubits might slightly overlap—the rear tail of the first qubit might overlap with the front tail of the following qubit. This means that in the no-qubits gates, there is a tiny probability that a photon impinges the detectors (the detection probability of the no-qubits gates will be a few percent of the detection probability of the qubit gates).

In the rest of this document, we will consider that the oversampling ratio equals two. However, the same kind of reasoning can be applied to any ratio values larger than one. When the QKD emitter and the QKD receiver are properly synchronized, as mentioned above, half of the acquisition gates are applied when one qubit impinges the detectors, whereas the other half gates are applied when no photons should arrive on the detectors. So, half of the gates are used for the key generation and the other half is used for the synchronization tracking. Since gates can be used for two different purposes, the data acquisition and post-processing performed on those two categories of gate are different. Considering a gate superimposed with the time of arrival of a single photon, one can name this gate as 'the qubit acquisition gate', the previous gate as 'the preceding acquisition gate' and the next gate as 'the following acquisition gate'. All detections are counted so that we can extract the relative probabilities of detection in the different acquisition gate classes (qubit, previous and following gates).

Figure 4:
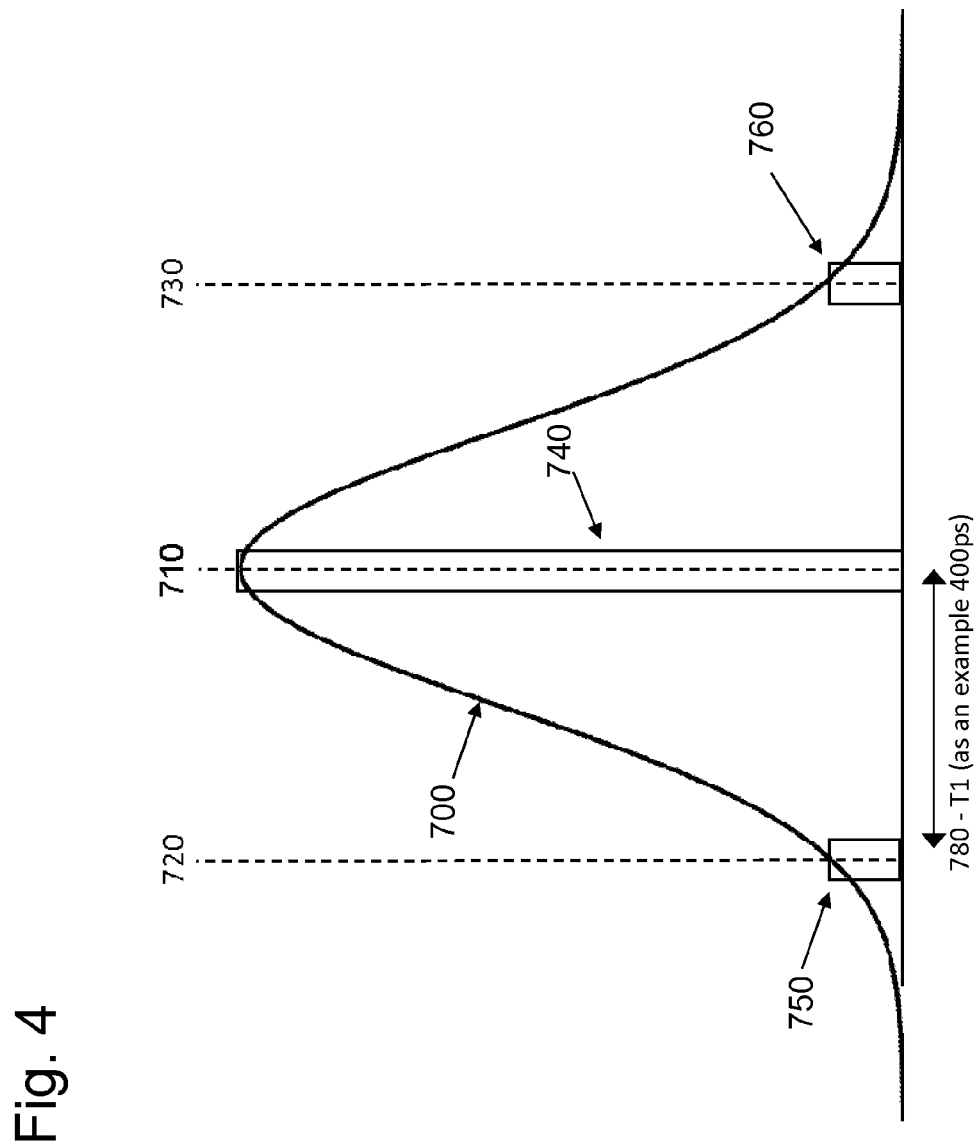
FIG. 4 is a schematic view of the time-shift detection system for frequency alignment.

Firstly, we can assume that the temporal statistical distribution of the qubit detections follows a normal distribution (700) as shown in FIG. 4. In FIG. 4, the times of activation of the different gates are represented by dash vertical lines (710, 720 and 730 correspond to the times of acquisition on the qubit, the preceding and the following gates respectively). The rectangles (740), (750) and (760) represent the amount of detections for each timing (710), (720) and (730) respectively. The heights of those rectangles equal the heights of the intersection between (700) and the three dash lines. The qubit gate is correctly adjusted with respect to the qubit when (740) is maximal, hence when (710) matches the maximal value of the distribution (700). Because a normal distribution is symmetric, the detection amounts (750) and (760) are identical. So, when the qubit gate is properly adjusted, the detection probabilities in the preceding and the following gates are identical. (780) shows the oversampling period.

Figure 5:
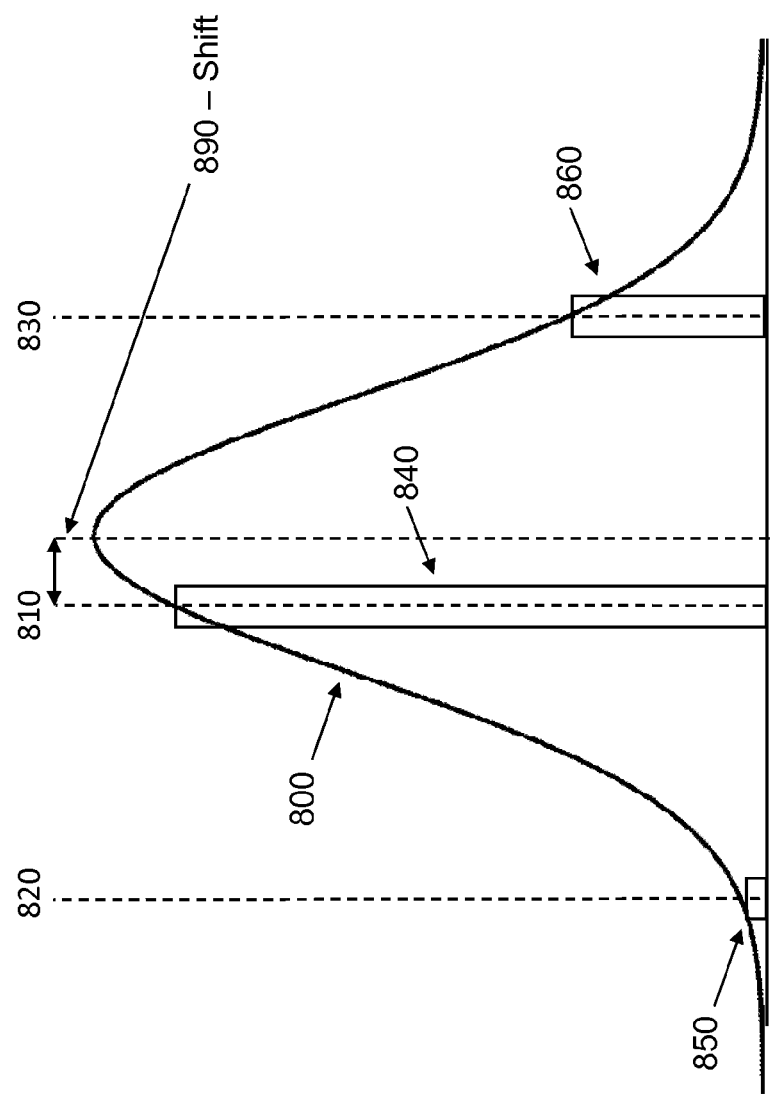

FIG. 5 shows the probabilities of detection when a shift of desynchronization (890) perturbs the system. The probability of detection (840) in the qubit gate (810) is lower than (740) which corresponds to the optimal alignment of the detection sampling. This can tell us that a shift happened but there is no way to know in which direction. However, the probabilities (850) and (860) in the preceding (820) and following (830) gates aren't equal anymore. Their ratio tells us in which direction the shift happened. E.g., if (860) is higher than (850), we know that the qubit gate (810) is applied too early compared to the time of arrival of the qubit. Empirically the ratio can also tell us the size of the shift. In order to resynchronize the system, an additional delay of the size of this shift will be applied on the acquisition detection gate in order to be back in the situation where (850) and (860) are equal. So, it is possible to compensate the shift by changing the delay of either the quantum channel or the service channel.

In practice, the distribution isn't normal, but we can empirically determine what the value of the ratio of the detection probabilities in the preceding and following acquisition gates is when the detection probability in the qubit acquisition gate is maximal. Then, when a shift in phase happens we can change the delays until that ratio equals the empirically measured optimal one again.

This methods permit to track the shifts in phase and to automatically compensate them so that a continuous synchronization of the quantum channel can be achieved. This continuous synchronization will be described in details below.

Figure 6:
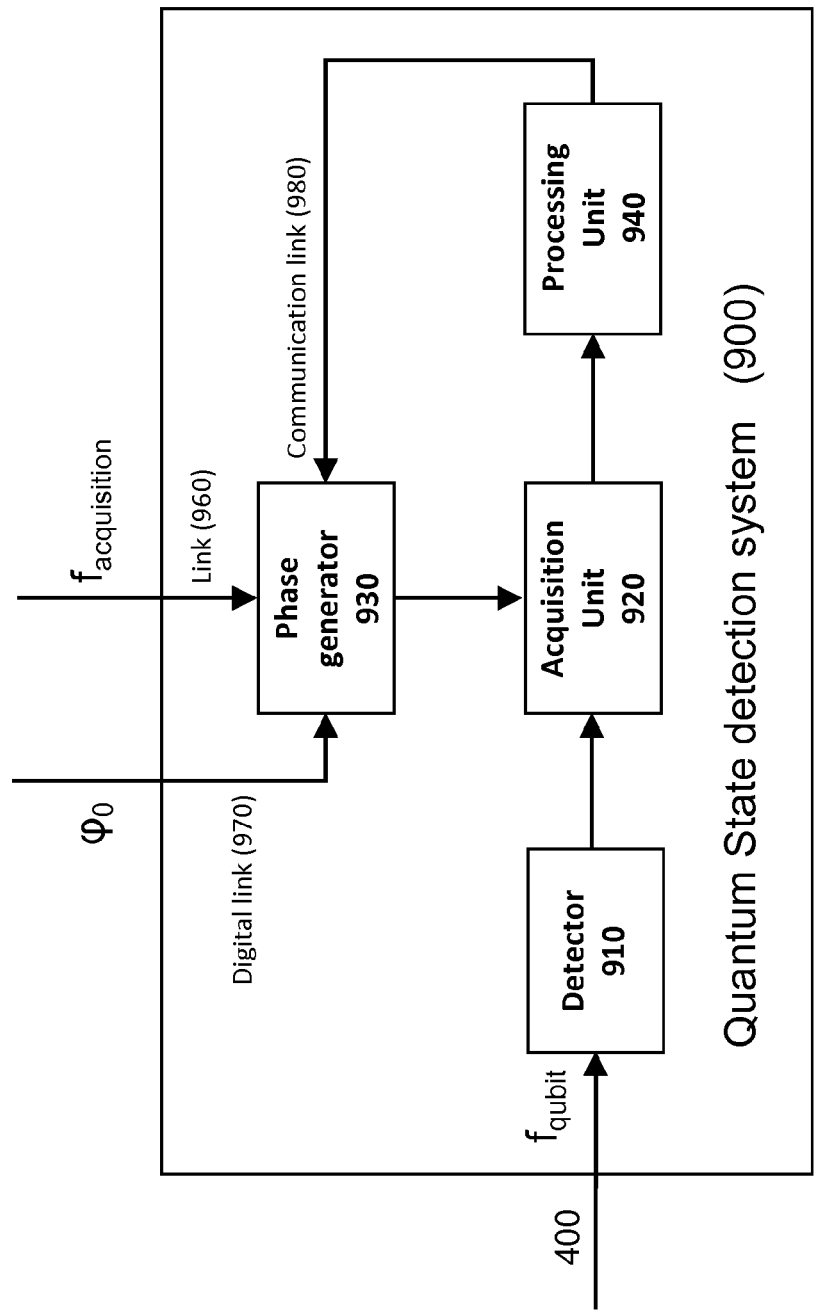
FIG. 6 is a schematic view of the tracking system apparatus.

An example of apparatus for this method is shown in FIG. 6. The quantum state (or qubit) detection subsystem (900) is a subsystem from the quantum receiver (200). This subsystem (900) is composed of: a detector (910) which is appropriate for the detection of quantum particles (e.g. a single photon detector based on avalanche photodiode); an acquisition unit (920) which performs the acquisition of the output signal from the detector (910) (e.g. a discriminator with a digital output signal); a phase generator (930) which applies a given phase value on a periodic electrical signal (e.g. a delay generator for electrical signal), and a processing unit (940) which process the digital data generated by the acquisition (or sampling) of the detector (910) output. The qubits are sent onto the detector (910) through the channel (400) that can be made of an optical fibre. Those qubits impinge the detector (910) at a frequency rate of $f_{qubit}$. The detector (910) generates an analog electrical signal which depends on the flow of qubits arriving onto it. This analog signal is sent to the acquisition unit (920) for sampling. The acquisition unit (920) performs the sampling of this analog signal at a frequency rate $f_{acquisition}$ provided by the quantum receiver (200) through a link (960) (e.g. a copper wire). Furthermore, the clock used by the acquisition unit (920) is phase-shifted by the phase generator (930). The phase value applied by (930) can be a phase value $\varphi_0$ provided by the quantum receiver (200) via the digital communication link (970) (e.g. a serial communication link) or by the processing unit (940) via the digital communication link (980) (e.g. a serial communication link). The processing unit (940) (e.g. a microcontroller) is used for sorting the acquired detections into the three different acquisition gate classes (qubit, previous and following gates) and computing the respective probability ((840), (850), (860)) of detection regularly (e.g. every second). Then, (940) can estimate the phase-shift that needs to be applied in order to resynchronize the quantum communication channel. This estimated phase-shift is sent to the phase generator (930). Phase generator (930) uses this input from (940) to correct the phase value that it applies on the clock used for the acquisition of the detector (910) output signal. This apparatus allows a continuous working of the tracking method described above.

Transmission of the Quantum Communication Channel Frequency (or Delay) Using Both the Quantum Communication Channel and the Service Channel Capacities The described technique of tracking of the quantum channel synchronization is able to continuously track the phase shift between the qubit receiving clock (which is the qubit emission clock also) and the qubit acquisition clock. However, it is not able to track the changes of frequency between those two clocks and even will not work if those changes are not avoided. So, the QKD emitter and the QKD receiver need to be able to share the same quantum channel frequency clock continuously through one of the two available communication channels (quantum and service).

Standard service channel throughput needs for QKD applications are of hundreds of Mbits/s up to several Gbits/s. Those values of throughputs are currently easily achieved by commercial and standardized solutions (e.g. Gbits/s Ethernet). If one wants to share the same frequency clock on both sides of a quantum channel, one option is to use the same frequency clock for the quantum and the service channels, or that the service channel frequency clock is a harmonic frequency of the quantum channel one or vice versa. In this case, the frequency clock of the service channel is shared between the two QKD apparatus with conventional techniques and the frequency clock of the quantum channel is built on both sides from this shared service channel frequency clock. If the quantum communication channel is not periodic, its pattern can be transmitted through the service channel if this pattern is identical to the pattern of the service channel or a portion of it. This technique of using the same frequency clock or pattern between the service and the quantum communication channel has not been proposed up to now for two technical reasons. Firstly, in most systems the quantum channel frequency clock is much smaller that the service channel frequency clock. This is due to a practical limitation of the maximal speed of single photon detection techniques (especially the ones working at telecom wavelengths). Hence, up to very recently it was not possible to run qubit detection system at hundreds MHz or GHz rates. Secondly, even though detection rates of GHz have been technically possible for a few years until now, people never tried to enslave the quantum channel frequency clock to the service channel one, because it means that developers need to implement the service channel themselves whereas there are cheap and effective commercial solutions that exist for a while. Since the QKD systems up to now don't have strong requirements in terms of cost, size and speed, it didn't make any sense not to use off-the-shelf components. When speed of the quantum channel increases the memory resource need increases too because the emitter has to wait for the announcement of the detections from the receiver before starting the shifting or basis reconciliation step, step in which the data related to the undetected qubits can be removed from the memory. The delay of this announcement is linked to the time of flight of the communication signal plus the propagation time of this signal through the different electrical components on its way in both apparatus. So, in order to reduce the memory resources of a fast QKD system it is important to reduce as much as possible the internal delays of the service channel in both apparatus. The best way to do it is to implement both the quantum and service channels with the same control unit (e.g. a FPGA). In addition, this will reduce the size and the cost of the device because the same resource is shared for both communication channels.

A data link usually used as the classical channel needed by QKD is used as a means for clock carry allowing keeping the same frequency on both sides at the emitter and receiver. The system and method disclosed enable QKD frequency synchronization and phase alignment with only two channels, whereas a dedicated channel for clock transmission and synchronization is usually needed. Additionally a tracking system based on over-sampling of the quantum link allowing maintaining the phase between sender and receiver thus allowing running continuously after calibration, without any need for resynchronization.

While the present invention is described above in connection with preferred embodiments, it will be understood that it is not so limited to the described or illustrated embodiments, but by the scope of the appended claims.

The invention claimed is:

1. A method of synchronizing a quantum key distribution system with only two communication channels between a transmitter and a receiver, one quantum communication channel, transmitting quantum particles or states and the other one, a service channel, transmitting classical data, wherein said two channels are continuously self-synchronized, characterized in that:

a frequency clock of the quantum communication channel is a multiple or a fraction of the frequency clock of the service channel, and a system running phase for the quantum communication channel is initiated after synchronization and alignment, during which classical data are transmitted over said service channel and in that it comprises an ongoing phase tracking step carried out during said system running phase for detecting and correcting any phase misalignment appearing in the quantum communication channel during said system running phase wherein the phase tracking includes:

modifying a detection acquisition frequency rate so as to be a multiple of a qubit emission rate so as to obtain a gate superimposed with a time of arrival of a photon, a preceding gate and a following gate;

measuring probabilities of detection in the three different gates, evaluating an amount and direction of desynchronization;

correcting a phase value with respect to an estimated desynchronization value; and judging that the channels are synchronized when the probability of detection of arrival is maximal.

2. The method of claim 1, characterized in that said phase tracking further comprises:

comparing the probabilities of detection in the preceding and following gates to each other.

3. The method of claim 1, characterized in that an acquisition gate is activated by the receiver at an expected arrival time of a quantum key signal.

4. The method of claim 1, characterized in that frequency synchronization is established for the two transmission channels in a first step during a start-up phase.

5. The method of claim 1, characterized in that phase alignment is established between the two channels by measuring a time difference (Delta T) between signals sent simultaneously from the transmitter to the receiver through both transmission channels.

6. The method of claim 5, characterized in that said time difference is the difference of a reception time of the signals respectively sent through the two transmission channels.

7. An apparatus comprising an emitter, a receiver and two communication channels between the emitter and the receiver, one being a quantum communication channel, transmitting quantum states or particles and the other one, a service channel, transmitting classical data for machine operation, wherein said two channels are continuously self-synchronized by means of using frequencies of both channels that are proportional, and wherein the apparatus comprises a clock data recovery apparatus capable of extracting from said classical data, transmitted over the service channel, a frequency clock of the Service channel and wherein the frequency clock of the quantum communication channel is a multiple or a fraction of the frequency clock of the service channel, and a system running phase for the quantum communication channel is initiated after synchronization and alignment, during which classical data are transmitted over said Service channel and in that it comprises an ongoing phase tracking step carried out during said system running phase for detecting and correcting any phase misalignment appearing in the quantum communication channel during said system running phase wherein the phase tracking step includes:

modifying a detection acquisition frequency rate so as to be a multiple of a qubit emission rate so as to obtain a gate superimposed with a time of arrival of a photon, a preceding gate and a following gate;

measuring probabilities of detection in the three different gates, evaluating an amount and direction of desynchronization;

correcting a phase value with respect to an estimated desynchronization value; and judging that the channels are synchronized when the probability of detection of arrival is maximal.

8. The apparatus of claim 7, characterized in that the apparatus comprises a phase Adaptation unit, capable of correcting any phase misalignment between said quantum communication channel and said service channel detected during a system running phase by means of a tracking step involving over-sampling.

* * * * *